(12) United States Patent
Ishida

(10) Patent No.: US 8,125,865 B2
(45) Date of Patent: Feb. 28, 2012

(54) OPTICAL DISC AND OPTICAL DISC APPARATUS

(75) Inventor: Takashi Ishida, Kyoto (JP)

(73) Assignee: Panasonic Corporation, Osaka (JP)

( * ) Notice: Subject to any disclaimer, the term of this patent is extended or adjusted under 35 U.S.C. 154(b) by 526 days.

(21) Appl. No.: 11/663,735

(22) PCT Filed: Sep. 26, 2005

(86) PCT No.: PCT/JP2005/017638
§ 371 (c)(1),
(2), (4) Date: Mar. 26, 2007

(87) PCT Pub. No.: WO2006/035721
PCT Pub. Date: Apr. 6, 2006

(65) Prior Publication Data
US 2008/0056093 A1    Mar. 6, 2008

(30) Foreign Application Priority Data
Sep. 28, 2004    (JP) .................................. 2004-281541

(51) Int. Cl.
*G11B 7/00*    (2006.01)
(52) U.S. Cl. ........................................ 369/47.53; 369/94
(58) Field of Classification Search ........................ None
See application file for complete search history.

(56) References Cited

U.S. PATENT DOCUMENTS 6,614,735 B2    9/2003    Shoji et al.
(Continued)

FOREIGN PATENT DOCUMENTS

CN    1447968    10/2003
(Continued)

OTHER PUBLICATIONS

Supplementary European Search Report issued Aug. 14, 2008 in the Application No. EP 05 78 5219.

(Continued)

*Primary Examiner* — Peter Vincent Agustin
*Assistant Examiner* — Emily Frank
(74) *Attorney, Agent, or Firm* — Wenderoth, Lind & Ponack, L.L.P.

(57) ABSTRACT

A recordable dual-layer optical disc which allows precise recording learning on both layers. A first information recording layer located further from the light incidence side includes a read-only control data area, a first test area, and a second test area. A second information layer located closer to the light incidence side includes a third test area located at a position opposite to the control data area, and a fourth test area located at a position opposite to the second test area.

12 Claims, 10 Drawing Sheets

U.S. PATENT DOCUMENTS

| | | |
|---|---|---|
| 6,990,055 B1 | 1/2006 | Nakamura et al. |
| 2001/0026516 A1 | 10/2001 | Shoji et al. |
| 2003/0137915 A1 | 7/2003 | Shoji et al. |
| 2003/0169651 A1* | 9/2003 | Kobayashi ............ 369/44.28 |
| 2003/0185121 A1 | 10/2003 | Narumi et al. |
| 2003/0227846 A1* | 12/2003 | Lee et al. ............ 369/53.21 |
| 2004/0013067 A1* | 1/2004 | Lee et al. ............ 369/53.22 |
| 2004/0076907 A1 | 4/2004 | Inoue et al. |
| 2004/0085874 A1 | 5/2004 | Akiyama et al. |
| 2004/0125738 A1* | 7/2004 | Lee et al. ............ 369/275.3 |
| 2004/0156294 A1* | 8/2004 | Watanabe et al. ........... 369/94 |
| 2004/0264339 A1 | 12/2004 | Miyagawa et al. |
| 2005/0013222 A1* | 1/2005 | Lee et al. ............ 369/47.51 |
| 2005/0013223 A1 | 1/2005 | Lee |
| 2005/0030862 A1* | 2/2005 | Ninomiya ............ 369/47.53 |
| 2005/0259561 A1 | 11/2005 | Nakamura et al. |
| 2005/0270935 A1 | 12/2005 | Lee |
| 2007/0171794 A1 | 7/2007 | Ninomiya et al. |
| 2007/0223347 A1 | 9/2007 | Ninomiya |
| 2008/0074980 A1 | 3/2008 | Narumi et al. |

FOREIGN PATENT DOCUMENTS

| | | |
|---|---|---|
| CN | 1516868 | 7/2004 |
| EP | 1 318 509 | 6/2003 |
| EP | 1 492 098 | 12/2004 |
| EP | 1 607 948 | 12/2005 |
| EP | 1 693 836 | 8/2006 |
| JP | 2000-311346 | 11/2000 |
| JP | 2001-52337 | 2/2001 |
| JP | 2001-338422 | 12/2001 |
| JP | 2004-206849 | 7/2004 |
| TW | 200415642 | 8/2004 |
| WO | 00/79525 | 12/2000 |
| WO | 02/23542 | 3/2002 |
| WO | 2004/112007 | 12/2004 |
| WO | 2005/001825 | 1/2005 |

OTHER PUBLICATIONS

Chinese Office Action (with English Translation) issued Mar. 10, 2010 in the corresponding Chinese Application No. 200910001880.3.

Chinese Office Action (with English Translation) issued Apr. 8, 2010 in the corresponding Chinese Application No. 200910145286.1.

* cited by examiner

OPTICAL DISC AND OPTICAL DISC APPARATUS

BACKGROUND OF THE INVENTION

1. Technical Field

The present invention relates to optical discs comprising two information recording layers with respective test areas. The present invention also relates to optical disc apparatuses recording data on such optical discs. The test areas are used in the adjustment of the conditions for driving, for example, the learning of recording conditions.

2. Background Art

In recent years, densities and capacities of optical discs have been increasing, and higher reliability thereof have been becoming important. In order to secure such higher reliability, optical disc apparatuses which record or reproduce data on or from such optical discs perform recording learning in order to obtain recording and reproduction conditions for optical discs (cf. Japanese Laid-Open Publication No. 2001-338422).

Recording learning is a series of operations to optimize the pulse conditions of laser pulses which strike an optical disc. The pulse conditions include, for example, the power levels of the laser pulses which strike the optical disc during recording, the conditions for timing and lengths of the laser pulses, and the like.

Other techniques under active development include providing an optical disc with an additional semitransparent information recording layer located in front of an original information recording layer in the direction of optical beams used in recording and reproduction, and thereby doubling the recording capacity of the optical disc. Such a dual-layer optical disc also requires recording learning. Operations of learning recording conditions are performed at the front layer (hereinafter, L1 layer) and the back layer (hereinafter, L0 layer) in the optical beam direction (cf. Japanese Laid-Open Publication No. 2000-311346).

SUMMARY OF THE INVENTION

Problems to be Solved by the Invention

However, there is a risk of failing to extract optimal recording conditions at the L0 layer in the conventional recording learning. More specifically, operations of recording learning may record a test signal by using a test recording power excessively higher than a recording power which is appropriate for recording data (hereinafter, Pwo1). An optical beam with such a test recording power may be affected, for example, its intensity may be changed while it passes through the L1 layer, even if the presence or absence of data recorded on the L1 layer does not affect the recording quality of the L0 layer when optical beams with the recording power Pwo1 are used. Thus, an optimal level of the recording power for the L0 layer (hereinafter, the Pwo0) may not be obtained.

The present invention is to solve the above-described problems. An object of the present invention is to provide optical discs that comprise two recordable information recording layers and allow precise recording learning on both of the layers. Another object of the present invention is to provide optical disc apparatuses which perform recording learning using such optical discs.

The optical disc according to the present invention is an optical disc comprising first and second information recording layers on which user data can be recorded, wherein data is recorded and reproduced through the same light incidence side of the optical disc on the first and second information recording layers. The first information recording layer includes a first test area located at an inner radius, a second test area located at an outer radius, and a first data recording area on which user data is recorded. The second information recording layer includes a third test area located at an inner radius, a fourth test area located at an outer radius, and a second data recording area on which user data is recorded. The first test area and the third test area are located at different radiuses and do not overlap each other. The second test area and the fourth test area are located at substantially equal radiuses. Thus, the above-described objects can be achieved.

For example, the first information recording layer may be a layer further away from the light incidence side and the second information recording layer may be a layer closer to the light incidence side. The first test area and the third test area may be areas used in the learning of recording conditions on the inner radiuses. The second test area and the fourth test area may be areas used in the learning of recording conditions on the outer radiuses.

The first information recording layer may include a read-only control data area. In addition, the third test area may be located at a position opposite to the control data area.

The control data area may have an embossed pit, a wobble groove, or a wobble pit which represents predetermined control data.

The control data area, the first test area, and the first data recording area may be located in this order from the inner radius on the first information recording layer. The third test area and the second data recording area may be located in this order from the inner radius in the second information recording layer.

The distance between the innermost radius R1 of the first test area and the outermost radius R2 of the third test area may be equal to or greater than the sum of track eccentricities of the first information recording layer and the second information recording layer.

The distance between the radius R1 and the radius R2 may be equal to or greater than a distance corresponding to the sum of the track eccentricities of the first information recording layer and the second information recording layer plus a beam radius of reading light on the second information recording layer when the reading light converges on the first information recording layer.

The distance between the radius R1 and the radius R2 may be equal to or greater than a distance corresponding to the sum of the track eccentricities of the first information recording layer and the second information recording layer plus the sum of radial tolerances of the track starting ends of the first information recording layer and the second information recording layer.

The distance from the light incidence side to the first information recording layer may be equal to the distance between a light incidence side and an information recording layer of an optical disc comprising a single information recording layer.

The control data area may store control data concerning both the first information recording layer and the second information recording layer.

Writing into the test areas may be performed continuously from the inner radius to the outer radius, or vice versa.

Data may be written continuously from the first information recording layer, which is located further from the light incidence side, to the second information recording layer, which is located closer to the light incidence side.

An optical disc apparatus according to the present invention is an optical disc apparatus configured to record data on the above-described optical disc, and comprises an optical head, an optical head driver unit, and a control unit. The optical head is configured to irradiate the optical disc with light, and output a signal in response to light reflected from the optical disc. The optical head driver unit is configured to drive the optical head under predetermined recording conditions. The control unit is configured to control the optical head driver unit in response to the signal received from the optical head. The control unit performs recording learning at the first test area and the third test area, and thereby determines respective recording conditions for the first information recording layer and the second information recording layer.

In the dual-layer optical disc of the present invention, the first test area and the third test area do not overlap each other. Thus, appropriate recording learning is possible at the information recording layer located further from the light incidence side, even if the intensity of optical beams is affected by the recorded conditions of the information recording layer located closer to the light incidence side while the optical beams pass through the information recording layer.

Since the second test area and the fourth test area are located at the outer radiuses of the data recording areas, recording learning can also be performed on the outer radiuses. This allows the recording of high quality data throughout the data recording areas.

Furthermore, since the second test area and the fourth test area overlap each other, the decrease in the recording capacity of the data recording areas can be reduced.

Figure 1:
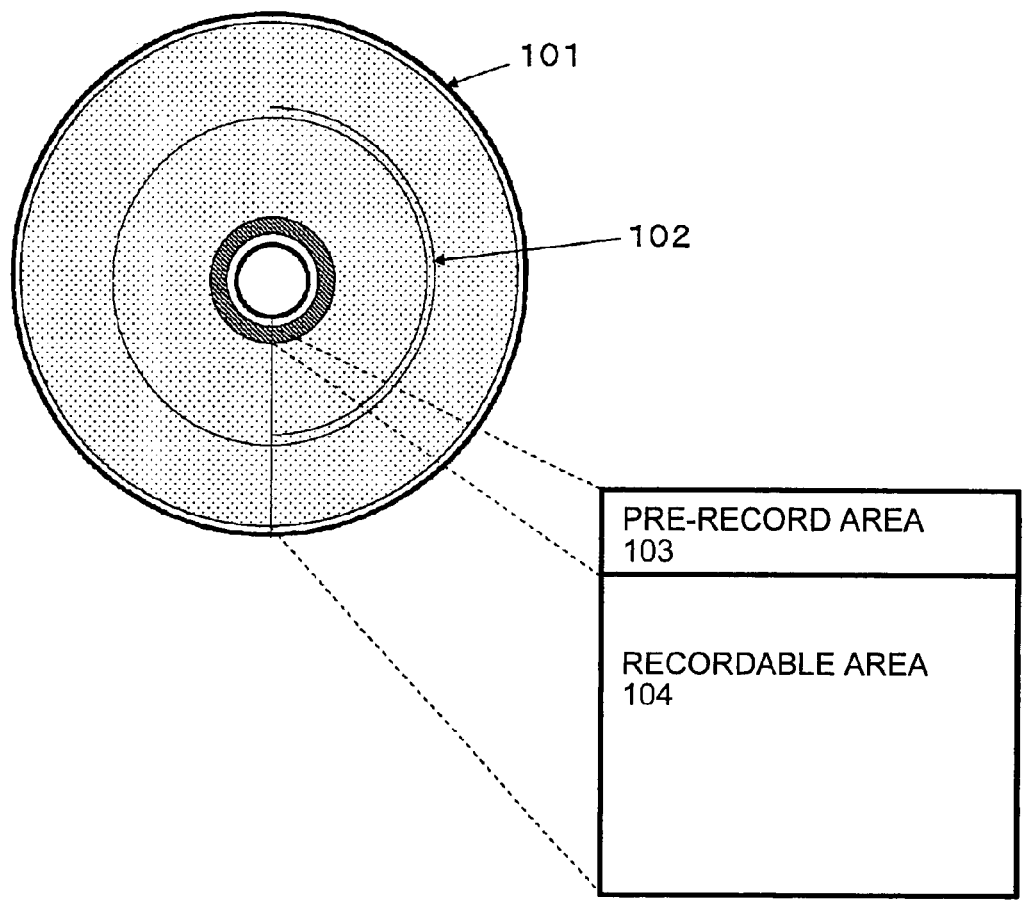
FIG. 1 is a schematic diagram showing a configuration of an optical disc 101 according to Embodiment 1 of the present invention.

DESCRIPTION OF REFERENCE SYMBOLS 101 optical disc
102 track
201 substrate
202 first information recording layer
203 spacing layer
204 second information recording layer
205 transparent layer
304a control data area
306a first test area
304b third test area
315a second test area
315b fourth test area

DETAILED DESCRIPTION OF THE INVENTION

The optical disc of the present invention includes test areas on both of the L0 layer and the L1 layer, and a control data area consisting of an embossed pit, a wobble grove, or a wobble pit on the L0 layer, which is a reference layer. The test area of the L1 layer is located at a position opposite to the control data area of the L0 layer.

Embodiments of the present invention will be described below with reference to the drawings.

EMBODIMENT 1

FIG. 1 shows a configuration of an optical disc 101 according to Embodiment 1 of the present invention, particularly a configuration of a first information recording layer. On the optical disc 101, a plurality of tracks 102 are formed concentrically. Alternatively, a single track 102 or a plurality of tracks 102 may be formed in a spiral pattern on the optical disc 101.

The areas of the optical disc 101 include a pre-record area 103 and a recordable area 104.

The pre-record area 103 stores various parameters which are required to access the optical disc 101.

Recording learning, recording of user data, and reproduction of user data are performed at the recordable area 104.

Figure 2:
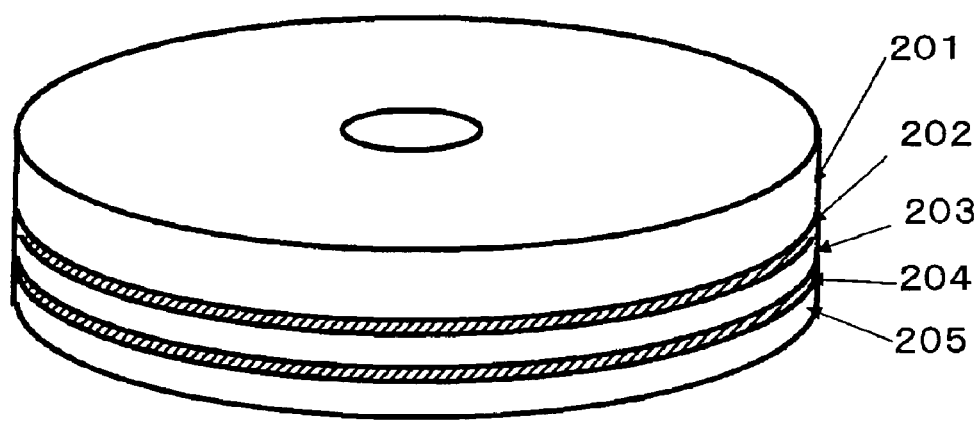
FIG. 2 is a diagram showing a structure of a dual-layer optical disc according to Embodiment 1 of the present invention.

FIG. 2 shows a structure of a dual-layer optical disc according to the present invention.

In FIG. 2, number 201 indicates a substrate, number 202 indicates a first information recording layer, number 203 indicates a spacing layer of an adhesive resin or the like, number 204 indicates a second information recording layer, and number 205 indicates a transparent layer. The side of the transparent layer 205 of the optical disc is irradiated with laser light. Data is recorded on and reproduced from the first information recording layer (L0 layer) 202 and the second information recording layer (L1 layer) 204.

In the dual-layer optical disc according to the present embodiment, the first information recording layer 202 is located at the same (axial) position with respect to the light incidence side as an information recording layer of a single-layer optical disc (not shown), which has only one information recording layer.

On the first information recording layer 202 and the second information recording layer 204, one or more tracks may be formed into a spiral pattern.

Figure 3:
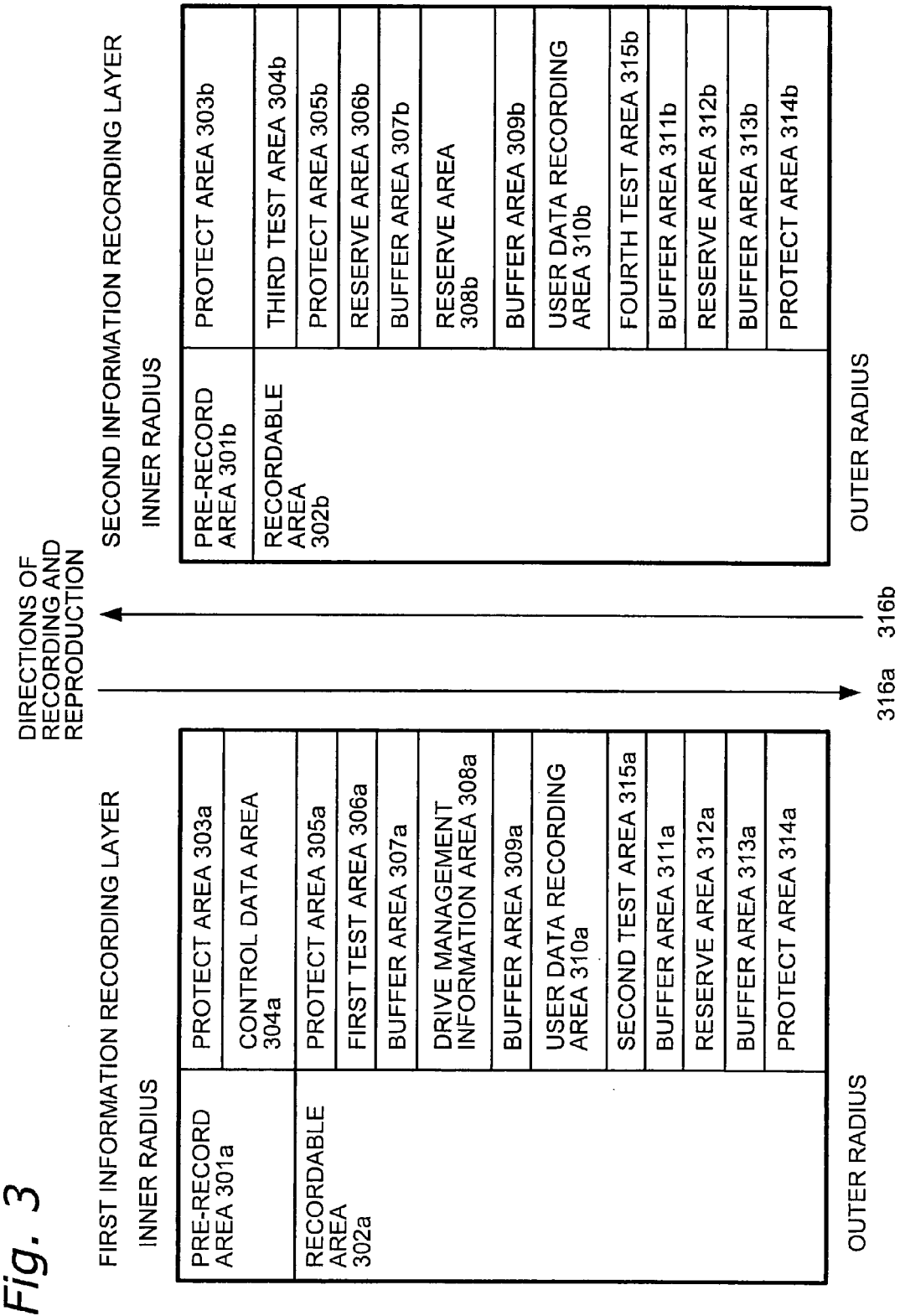
FIG. 3 is a diagram showing an arrangement of areas of the dual-layer optical disc according to Embodiment 1 of the present invention.

FIG. 3 shows an arrangement of areas located on the dual-layer optical disc shown in FIG. 2.

A pre-record area 301a of the first information recording layer is an area on which data such as identification data of the dual-layer optical disc is recorded in a wobble pattern of a track, embossed pits, a wobble pattern of embossed pits, or the like, which are formed on the substrate 201 or the spacing layer 203.

The pre-record area 301a includes a protect area 303a which serves as a buffer, and a control data area 304a which stores at least one of the following data as the identification information of the optical disc; a disc type, a disc size, a disc configuration, a channel bit, data zone allocation information, recording linear speed, maximum reproducible power, recording power information, recording pulse information, and disc intrinsic information. The control data area 304a includes data concerning both the first information recording layer and the second information recording layer.

A pre-record area 301b of the second information recording layer includes a protect area 303b which serves as a buffer.

A recordable area 302a of the first information recording layer includes: a protect area 305a which can be also used as a track pitch transition area when the pre-record area 301a and the recordable area 302a have different track pitches; a first test area 306a; a buffer area 307a; a drive management information area 308a used for the storage of data on various properties and the like of the optical disc; a buffer area 309a; a user data recording area 310a where user data and the like are recorded; a second test area 315a; a buffer area 311a; a reserve area 312a for use in future expansion; a buffer area 313a; and a protect area 314a.

A recordable area 302b of the second information recording layer includes a third test area 304b and a protect area 305b. The protect area 305b is located at the same radius as the protect area 305a of the first information recording layer. The third test area 304b of the second information recording layer is located at the same radius as the control data area 304a of the first information recording layer, or the outer radiuses thereof are the same.

The recordable area 302b of the second information recording layer includes a reserve area 306b for use in future expansion, a buffer area 307b, and a reserve area 308b, which are respectively located at the same radiuses as the first test area 306a, the buffer area 307a, and the drive management information area 308a of the first information recording layer.

The recordable area 302b of the second information recording layer includes a buffer area 309b, a user data recording area 310b where user data and the like are recorded, a fourth test area 315b, a buffer area 311b, a reserve area 312b for use in future expansion, a buffer area 313b, and a protect area 314b, which are respectively located at the same radiuses as the buffer area 309a, the user data recording area 310a, the second test area 315a, the buffer area 311a, the reserve area 312a for use in further expansion, the buffer area 313a, and the protect area 314a of the first information recording layer.

Figure 4:
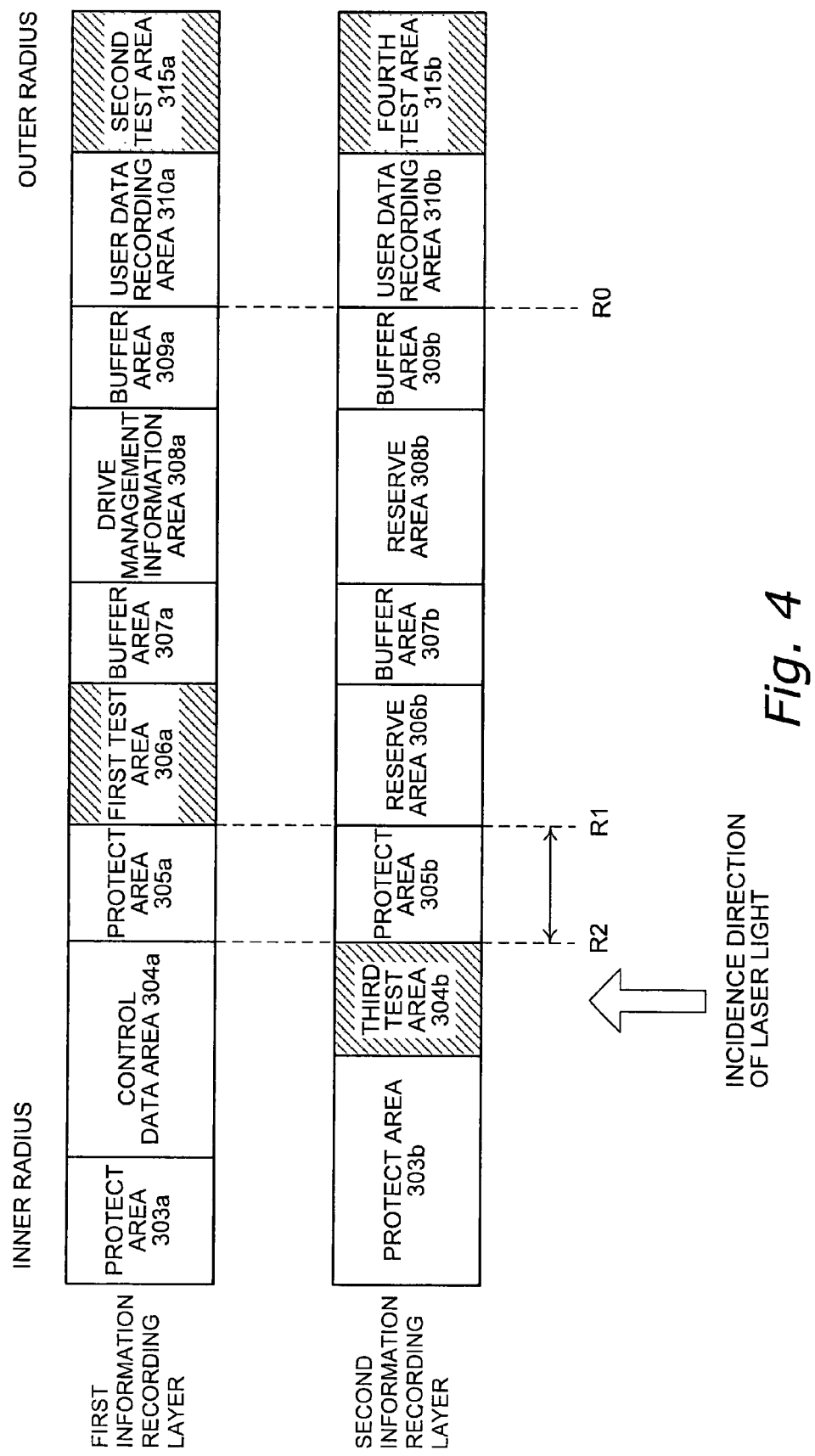
FIG. 4 is an arrangement diagram showing radiuses of the main areas of the optical disc according to Embodiment 1 of the present invention.

FIG. 4 is an arrangement diagram showing the radiuses of the main areas of the optical disc as described above.

An upper portion of FIG. 4 shows the protect area 303a, the control data area 304a, the protect area 305a, the first test area 306a, the buffer area 307a, the drive management information area 308a, the buffer area 309a, the user data recording area 310a, and the second test area 315a of the first information recording layer. A lower portion of FIG. 4 shows the protect area 303b, the third test area 304b, the protect area 305b, the reserve area 306b, the buffer area 307b, the reserve area 308b, the buffer area 309b, the user data recording area 310b, and the fourth test area 315b of the second information recording layer.

The third test area 304b is located at a radius opposite to (i.e. a radius which overlaps) the control data area 304a. The outermost radius R2 of the third test area 304b is equal to the outermost radius of the control data area 304a, and the innermost radius thereof is equal to or larger than the innermost radius of the control data area 304a. The control data on the control data area 304a is reproduced by irradiating pits or a wobble pattern of a track with optical beams and detecting the intensity of reflected light. Thus, fluctuations of the intensity of the optical beams hardly affect the quality of reproduction signals representing the control data, even if the optical beams passing through the second information recording layer are changed in intensity depending on the recorded conditions on the third test area 304b.

The third test area 304b is located at a radius different from that of the first test area 306a. Thus, recording learning for the first layer can be properly performed without affecting the first test area 306a.

The fourth test area 315b is located at substantially the same radius as and opposite to the second test area 315a. This is allowed because recording learning is performed for the second test area 315a and the fourth test area 315b at the outer radiuses after recording learning has been performed for the first test area 306a and the third test area 304b at the inner radiuses, and accordingly, recording learning for the second test area 315a and the fourth test area 315b uses recording power close to the optimum power, and hardly affects the other layers, such as transmittance changes or the like. The above arrangement allows recording learning at the outer radiuses to compensate for changes in recording characteristics at the outer radiuses, which are due to tilt or the like, and achieve better recording quality throughout the surface of the disc. In addition, the allocation of the two test areas at the same radius can suppress the reduction in recording capacity for user data caused by the two test areas.

The optical disc according to the present embodiment is a dual-layer disc. Here, a single-layer optical disc, which includes only a first information recording layer, requires no area to avoid an influence caused by the test area of the second information recording layer, since the single-layer disc does not include a second information recording layer. In the optical disc of the present embodiment, the control data area 304a is located at the radius which overlaps the third test area 304b. Thus, the first information recording layer requires no additional area opposite to the third test area 304b. This allows the optical disc of the present embodiment to have the same arrangement of areas as the single-layer optical disc as described above. For example, the innermost radiuses R0 of the user data recording area 310a and 310b can be matched with that in the signal-layer optical disc. Accordingly, the recording capacity for user data is not reduced. In addition, the radius and the address of the user data recording area are the same between the signal-layer optical disc and the dual-layer optical disc. This facilitates access of the optical disc apparatus by using optical beams in recording and reproduction operations, and allows the optical disc to avoid reduction in recording capacity for user data and the like.

The protect area 305a is located between the control data area 304a and the first test area 306a. The protect area 305a has a width corresponding to the difference between the innermost radius R1 of the first test area 306a and the outermost radius R2 of the third test area 304b.

Figure 5:
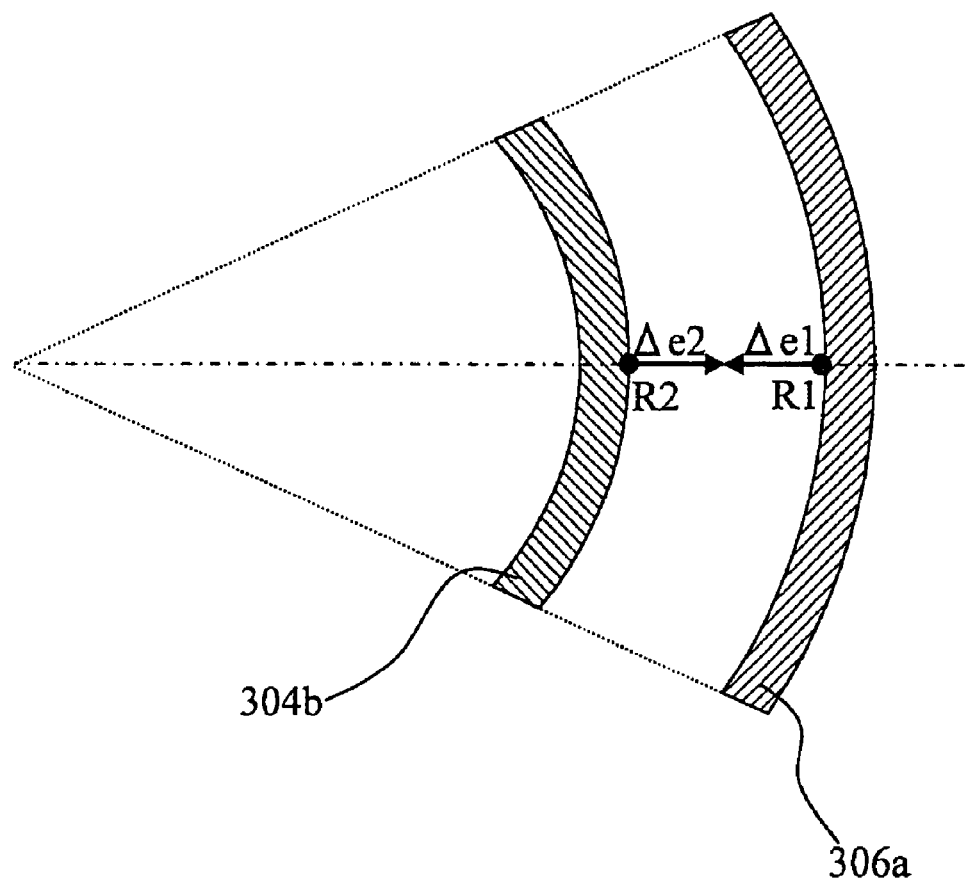
FIG. 5 is a diagram showing a relationship between track eccentricities and (R1-R2).
Figure 6:
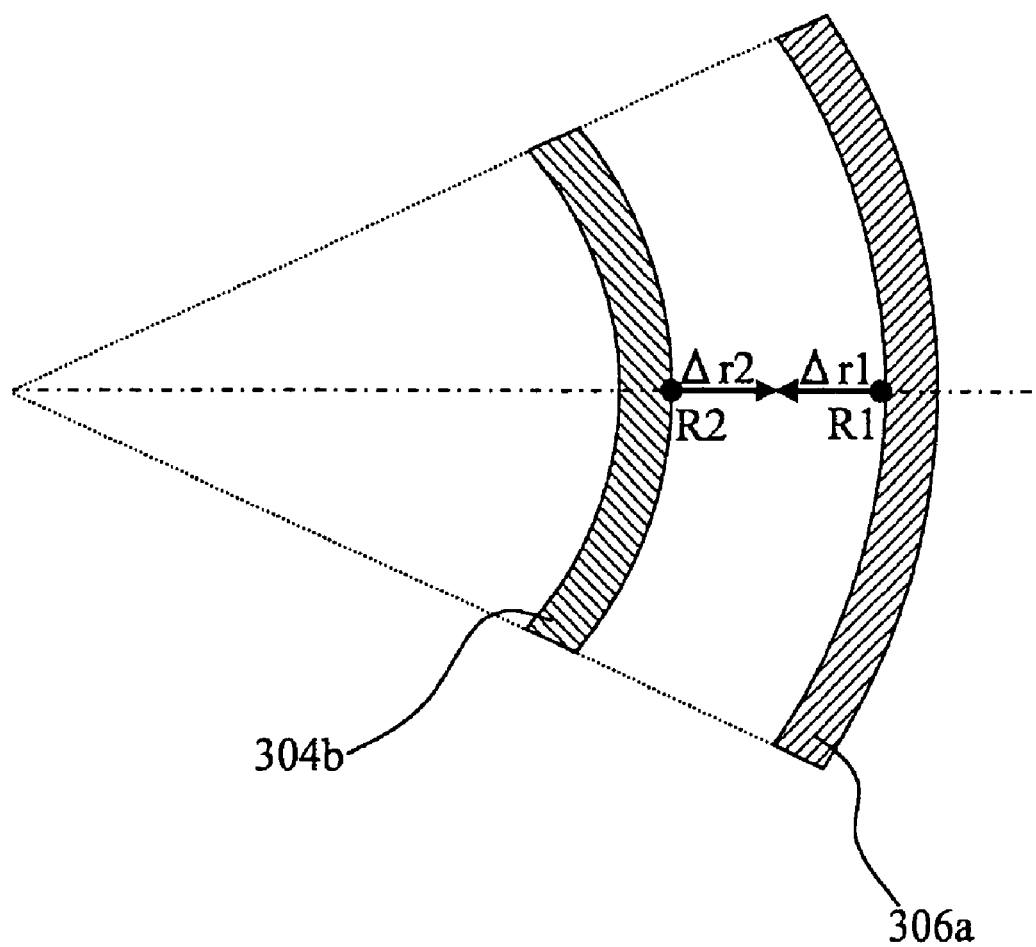
FIG. 6 is a diagram showing a relationship between position tolerances of track starting ends and (R1-R2).
Figure 7:
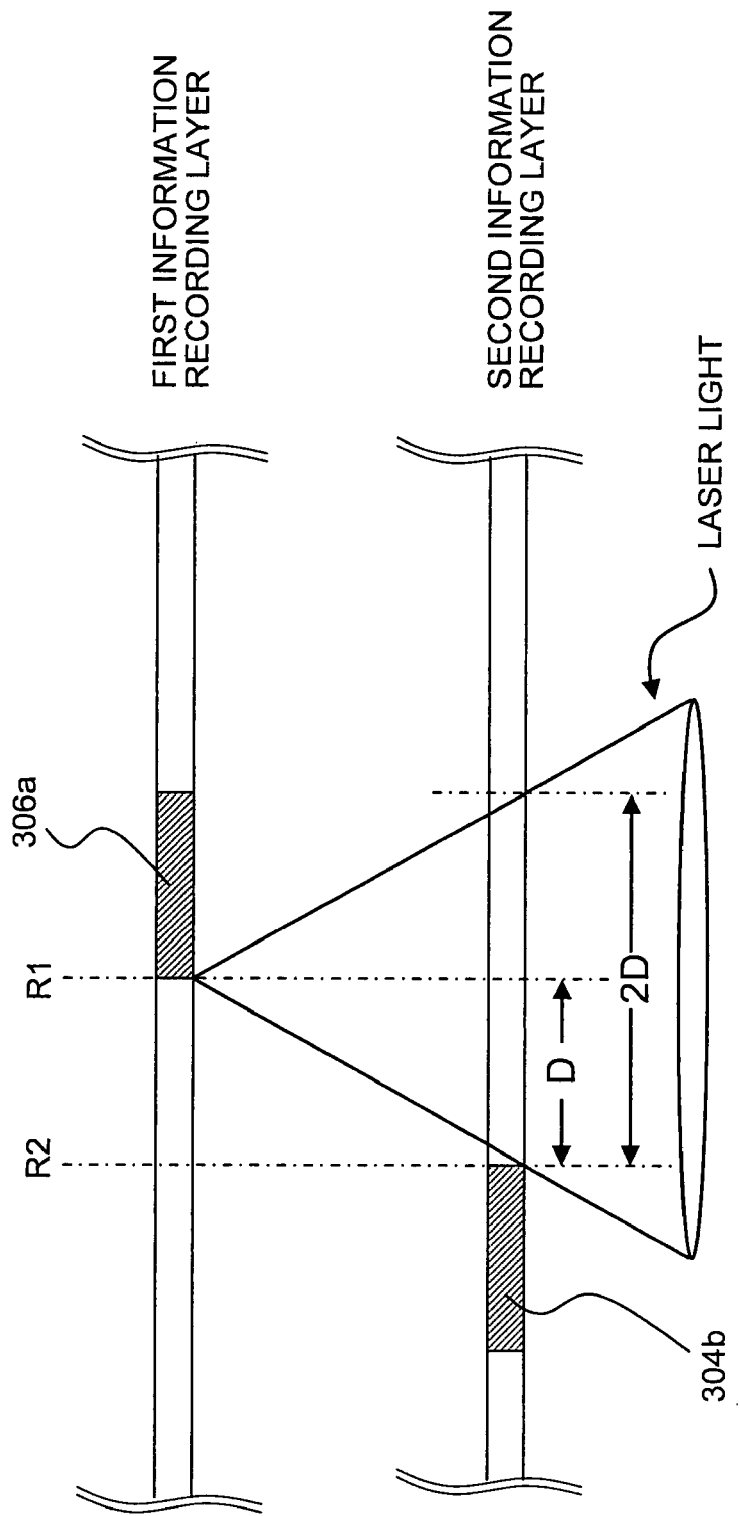
FIG. 7 is a diagram showing a relationship between beam radiuses of laser light and (R1-R2).

The width of the protect area 305a (R1-R2) is set in view of the track eccentricity $\Delta e1$ of the first information recording layer, the track eccentricity $\Delta e2$ of the second information recording layer, the beam radius D of laser light on one information recording layer when the laser light converges on the other information recording layer, the radial tolerance $\Delta r1$ of the track starting end of the first information recording layer, the radial tolerance $\Delta r2$ of the track starting end of the second information recording layer, and the like. More specifically, as shown in FIG. 5, the width of the protect area 305a (R1-R2) is determined such that the first test area 306a and the third test area 304b are located at the radiuses where they do not overlap each other even if the tracks of the information recording layers have the eccentricities $\Delta e1$ and $\Delta e2$, respectively. That is, the width of the protect area 305a (R1-R2) is determined to be $\Delta e1 + \Delta e2$ or longer. Furthermore, as shown in FIG. 6, the width of the protect area 305a (R1-R2) is determined such that the first test area 306a and the third test area 304b are located at the radiuses where they do not overlap each other even if the radiuses of the track starting ends on the information recording layers have the tolerances $\Delta r1$ and $\Delta r2$, respectively. That is, the width of the protect area 305a (R1-R2) is determined to be $\Delta r1+\Delta r2$ or longer. Furthermore, as shown in FIG. 7, the width of the protect area 305a (R1-R2) is determined such that the test area of one of the layers is not irradiated with the laser light converging on the test area on the other of the layers. That is, the width of the protect area 305a (R1-R2) is determined to be D or longer.

In this way, even if there are the track eccentricity and the tolerance, the first test area 306a and the third test area 304b do not overlap each other, and thereby, recording learning can be properly performed. Generally, the two layers may have track eccentricities and tolerances in opposite directions, and they may have both at the same time. In order to prepare for the worst, the width of the protect area 305a (R1-R2) is set to be $\Delta e1+\Delta e2+\Delta r1+\Delta r2+D$ or larger.

In this configuration, the control data area 304a stores media intrinsic information such as recording pulses of both the first information recording layer and the second information recording layer. Thus, all the identification information can be obtained if the first information recording layer is accessed at the first step. This offers an advantage that the startup operations of the optical disc drive becomes faster.

Generally, the optical disc apparatuses for recording and reproducing user data on and from the dual-layer optical disc according to the present embodiment can record and reproduce user data also on and from a signal-layer optical disc. In the dual-layer optical disc according to the present embodiment, the control data area 304a is located on the first information recording layer at the same position with respect to the light incidence side as the information recording layer of the signal-layer optical disc. When this dual-layer optical disc is loaded into an optical disc apparatus, the control data area 304a allows the optical beams to strike thereon under the same optical conditions. This results in an effect in which the identification information can be read smoothly.

EMBODIMENT 2

Figure 8:
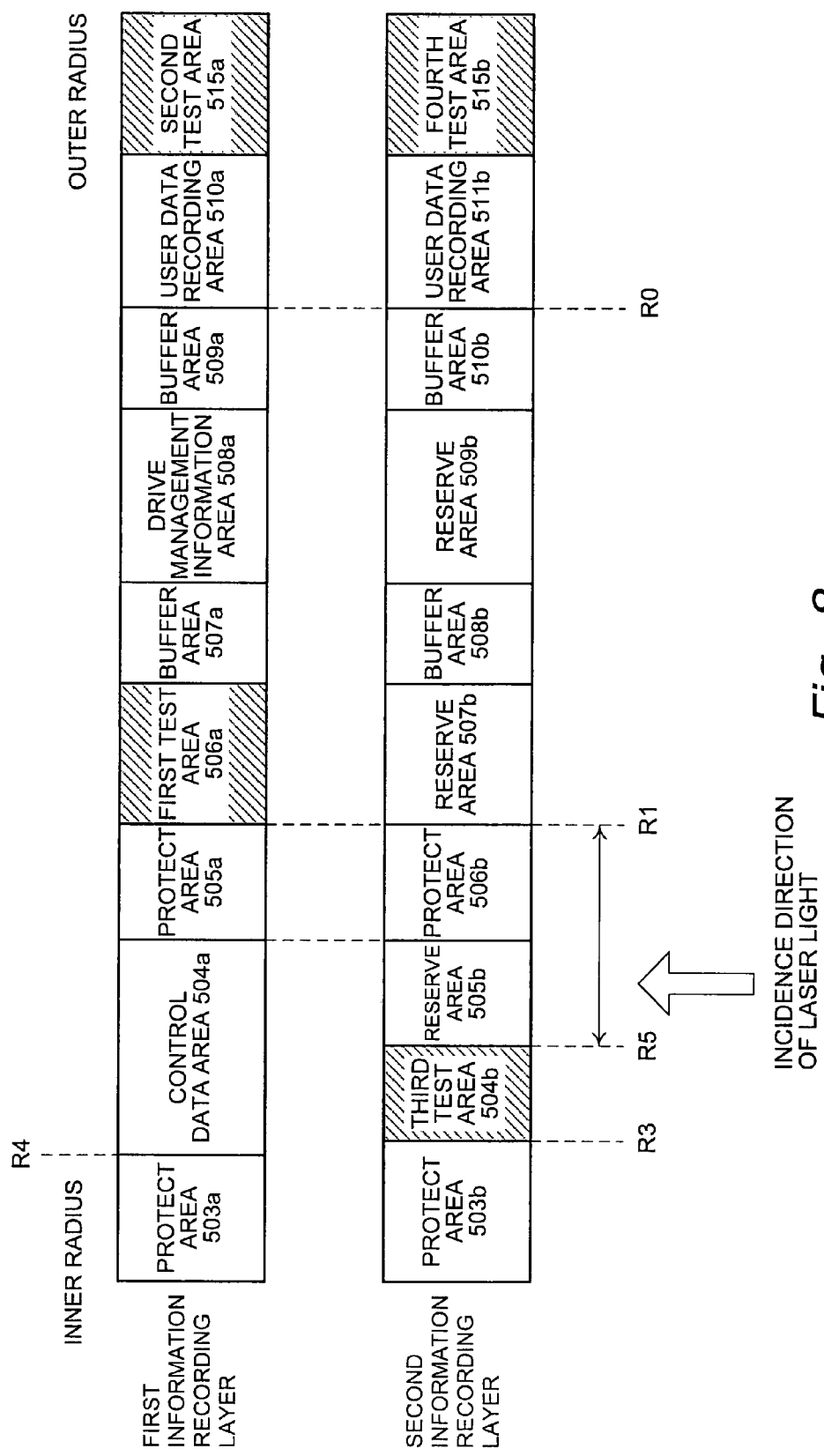
FIG. 8 is an arrangement diagram showing the radiuses of the main areas of the optical disc according to Embodiment 2 of the present invention.

FIG. 8 is an arrangement diagram showing the radiuses of the main areas of the optical disc according to another embodiment of the present invention.

An upper portion of FIG. 8 shows a protect area 503a, a control data area 504a, a protect area 505a, a first test area 506a, a buffer area 507a, a drive management information area 508a, a buffer area 509a, a user data recording area 510a, and a second test area 515a of the first information recording layer. A lower portion of FIG. 8 shows a protect area 503b, a third test area 504b, a reserve area 505b, a protect area 506b, a reserve area 507b, a buffer area 508b, a reserve area 509b, a buffer area 510b, a user data recording area 511b, and a fourth test area 515b of the second information recording layer. Other components of the structure and the contents of these areas are substantially the same as those of the dual-layer optical disc of Embodiment 1 as shown in FIG. 3. Thus, details thereof are omitted.

The third test area 504b is located at the radius opposite to the control data area 504a. The innermost radius R3 thereof is equal to or larger than the innermost radius R4 of the control data area 504a. The outermost radius R5 thereof is smaller than the outermost radius of the control data area 504a. The control data on the control data area 504a is reproduced by irradiating pits or wobble patterns of a track with optical beams and detecting the amount of reflected light. Thus, fluctuations of the intensity of the optical beams hardly affect the quality of reproduction signals representing the control data, even if the optical beams passing through the second information recording layer are changed in intensity depending on the recorded conditions on the third test area 504b.

The third test area 504b is located at a radius different from that of the first test area 506a. Thus, recording learning for the first layer can be properly performed without affecting the first test area 506a.

The fourth test area 515b is located at substantially the same radius as and opposite to the second test area 515a. This is allowed because recording learning is performed for the second test area 515a and the fourth test area 515b at the outer radiuses after recording learning has been performed for the first test area 506a and the third test area 504b at the inner radiuses, and accordingly, recording learning for the second test area 515a and the fourth test area 515b uses recording power close to the optimum power, and hardly affects the other layers, such as transmittance changes or the like. The above arrangement allows recording learning at the outer radiuses to compensate for changes in recording characteristics at the outer radiuses, which are due to tilt or the like, and achieve better recording quality throughout the surface of the disc. In addition, the allocation of the two test areas at the same radius can suppress the reduction in recording capacity for user data caused by the two test areas.

The optical disc according to the present embodiment is a dual-layer disc. Here, a single-layer optical disc, which includes only a first information recording layer, does not require an area to avoid the influence caused by the test area of the second information recording layer, since the single-layer disc does not include a second information recording layer. In the optical disc of the present embodiment, the control data area 504a is located at the radius to overlap the third test area 504b. Thus, the first information recording layer requires no additional area opposing the third test area 504b. This allows the optical disc of the present embodiment to have the same arrangement of areas as the single-layer optical disc as described above. For example, the innermost radiuses R0 of the user data recording area 510a and 511b can be matched with that in the signal-layer optical disc. Accordingly, the recording capacity for user data is not reduced. In addition, the radius and the address of the user data recording area are the same between the signal-layer optical disc and the dual-layer optical disc. This facilitates access of the optical disc apparatus by using optical beams in recording and reproduction operations.

Furthermore, the reserve area 505b is located adjacent and outside of the third test area 504b. The reserve area 505b and the protect area 506b constitute a spacing (R1-R5) between the innermost radius R1 of the first test area 506a and the outermost radius R5 of the third test area 504b. The spacing (R1-R5) is set in view of the track eccentricity $\Delta e1$ of the first information recording layer, the track eccentricity $\Delta e2$ of the second information recording layer, the beam radius D of laser light on one information recording layer when the laser light converges on the other information recording layer, the radial tolerance $\Delta r1$ of the track starting end of the first information recording layer, the radial tolerance $\Delta r2$ of the track starting end of the second information recording layer, and the like. More specifically, as described in Embodiment 1, the spacing (R1-R5) is determined to be equal to or greater than $\Delta e1+\Delta e2$, $\Delta r1+\Delta r2$, or D.

In this way, even if there are track eccentricity and tolerance, the first test area 506a and the third test area 504b do not overlap each other, and thereby, recording learning can be properly performed. Generally, the two layers may have track eccentricities and tolerances in opposite directions, and they may have both at the same time. In order to prepare for the worst, the spacing (R1-R5) is set to be $\Delta e1+\Delta e2+\Delta r1+\Delta r2+D$ or larger.

Furthermore, in the optical disc of this embodiment, a desired spacing may be provided between the two test areas by using not only the protect area 506*b* but also the reserve area 505*b*. This allows the protect area 505*a* and the protect area 506*b* to be reduced in width, and thus, the reduction in recording capacity for user data or the like to be further suppressed.

In this configuration, the control data area 504*a* stores media intrinsic information such as recording pulses of both the first information recording layer and the second information recording layer. Thus, all the identification information can be obtained if the first information recording layer is accessed at the first step. This offers an advantage that the startup operations of the optical disc drive becomes faster.

For the optical discs shown in Embodiments 1 and 2, the recording and reproduction direction may be determined as indicated by arrows 316*a* and 316*b* in FIG. 3. In the first information recording layer, user data may be continuously recorded from the inner radius to the outer radius until the user data recording area of the first information recording layer becomes full, and then user data may be recorded from the outer radius to the inner radius of the second information recording layer. In this case, the optical beams pass through the second information recording layer in a blank condition at the recording of user data on the first information recording layer. This allows a wider range of choices of materials for the second information recording layer, and in particular, the use of a recording material which may affect the transmitting light under the blank condition even if the optimal recording power Pwo1 is used. Even if such a recording material is used, the first test area 506*a* and the third test area 504*b* in the above configuration do not overlap each other as described above. Needless to say, recording learning is properly performed. Application of this configuration is more effective especially for write-once optical discs which allow recording only once, since recording generally continues from the inner radiuses to the outer radiuses, or vice versa.

Alternatively, the writing onto each of the test areas may be required to continue in the direction from the inner radiuses to the outer radiuses, or vice versa. This offers an advantage in that blank regions in each of the test areas are easy to recognize especially in write-once optical discs. Of course, target portions for recording and reproduction may be selected from the entire disc at random, without determining the recording and reproduction direction.

In the above Embodiments 1 and 2, the pre-record areas, especially the control data areas 304*a* and 504*a* may have track pitches wider than the recordable areas in order to stabilize the reproduction of identification information. In this case, the track pitches of the protect areas 303*b* and 503*b* may be equal to the recordable areas, since the pre-record areas of the second information recording layer includes only the protect areas 303*b* and 503*b*.

In Embodiments 1 and 2, a buffer area may be provided within the test areas. Any data may be written into the protect areas, the reserve areas, and the buffer areas.

EMBODIMENT 3

An optical disc apparatus for recording data on the optical discs described in Embodiments 1 and 2 will be described with reference to FIGS. 9 and 10.

Figure 9:
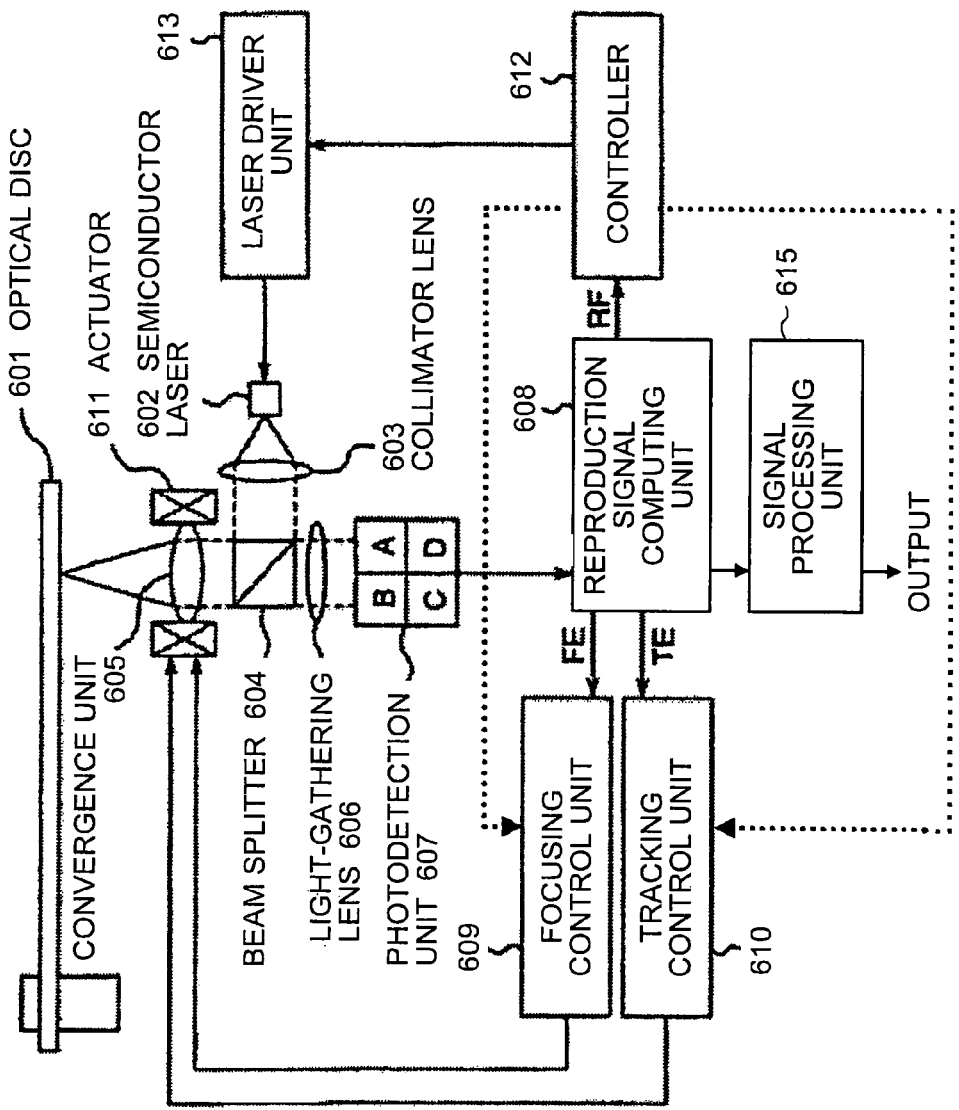
FIG. 9 is a block diagram showing an overview of an optical disc apparatus.

FIG. 9 is a block diagram showing an overview of the optical disc apparatus 600.

In FIG. 9, number 601 indicates an optical disc. The optical disc 601 has the configuration as described in Embodiment 1 or 2. Note that the optical disc apparatus 600 may be able to record data on an optical disc having a conventional configuration, for example, a single-layer optical disc.

Number 602 indicates a semiconductor laser; number 603 indicates a collimator lens; number 604 indicates a beam splitter; number 605 indicates a convergence unit; number 606 indicates a light-gathering lens; number 607 indicates a photodetection unit; number 608 indicates a reproduction signal computing unit; number 609 indicates a focusing control unit; number 610 indicates a tracking control unit; number 611 indicates an actuator; number 612 indicates a controller; number 613 indicates a laser driver unit; and number 615 indicates a signal processing unit.

An optical head consists of the semiconductor laser 602, the collimator lens 603, the beam splitter 604, the convergence means 605, the light-gathering lens 606, the photodetection unit 607, the actuator 611, and the like. An optical head driver unit consists of the focusing control unit 609, the tracking control unit 610, the laser driver unit 613, and the like. A control unit consists of the reproduction signal computing unit 608, the controller 612, and the like.

Next, reproduction operations will be described.

The optical disc 601 is, for example, an optical disc having two information surfaces. An optical spot is focused on one of the two information surfaces of the optical disc 601, a target for data reading.

The optical beam emitted from the semiconductor laser 602 passes through the collimator lens 603, the beam splitter 604, and the convergence unit 605, and converges on one of the two information surfaces on the optical disc 601. The focused optical spot is reflected and diffracted by the optical disc 601, and passes through the convergence unit 605, the beam splitter 604, and the light-gathering lens 606, and converges on the photodetection unit 607. The converging light is converted into voltage signal outputs depending on the intensity of the light on each of photoreceptor devices A, B, C, and D on the photodetection unit. The voltage signal is manipulated by the reproduction signal computing unit (circuit) 608.

FE signals, outputs of the reproduction signal computing unit 608, are sent to the focusing control unit 609. TE signals, outputs of the reproduction signal computing unit 608, are sent to the tracking control unit 610. RF signals, outputs of the reproduction signal computing unit 608, are sent to the controller 612.

The focusing control unit 609 drives the actuator 611 by using voltage outputs in response to the FE signals, and thereby controls the focusing of the optical spot on one of the two information surfaces of the optical disc 601.

The tracking control unit 610 drives the actuator 611 by using voltage outputs in response to the TE signals, and thereby controls the tracking of the optical spot to a desired track position on one of the two information surfaces of the optical disc 601. By using the optical spot under the focusing and tracking controls, data is read from an optical disc, especially from pre-pits, projections and depressions on the optical disc, or marks and spaces, light and dark regions with different reflectivities on the phase-change optical disc.

The controller 612 detects from the RF signals on which of the two information surfaces on the optical disc 601 the optical spot is focused. More specifically, the controller 612 detects from address values on which surface the optical spot is focused. The controller 612 controls the focusing control unit 609, the tracking control unit 610, and the laser driver unit 613.

Steps of the learning of recording conditions will be described with reference to FIG. 10.

When the learning of recording conditions is necessary, the controller 612 instructs the focusing control unit 609 and the tracking control unit 610 to access the first test area of the first information recording layer (step 701).

Next, the controller 612 instructs the laser driver unit 613, the focusing control unit 609, and the tracking control unit 610 to learn recording conditions for the first test area. For example, the laser driver unit 613 is instructed to perform test writing at various levels of recording power and determine the optimal recording power; the focusing control unit 609 is instructed to perform test writing at various focus positions and determine the optimal focus position; the tracking control unit 610 is instructed to perform test writing at various tracking positions and determine the optimal tracking position; and the like (step 702).

Then, the controller 612 instructs the focusing control unit 609 and the tracking control unit 610 to access the third test area of the second information recording layer (step 703).

Then, the controller 612 instructs the laser driver unit 613, the focusing control unit 609, and the tracking control unit 610 to learn recording conditions for the third test area. For example, the laser driver unit 613 is instructed to perform test writing at various levels of recording power and determine the optimal recording power; the focusing control unit 609 is instructed to perform test writing at various focus positions and determine the optimal focus position; the tracking control unit 610 is instructed to perform test writing at various tracking positions and determine the optimal tracking position; and the like (step 704).

Figure 10:
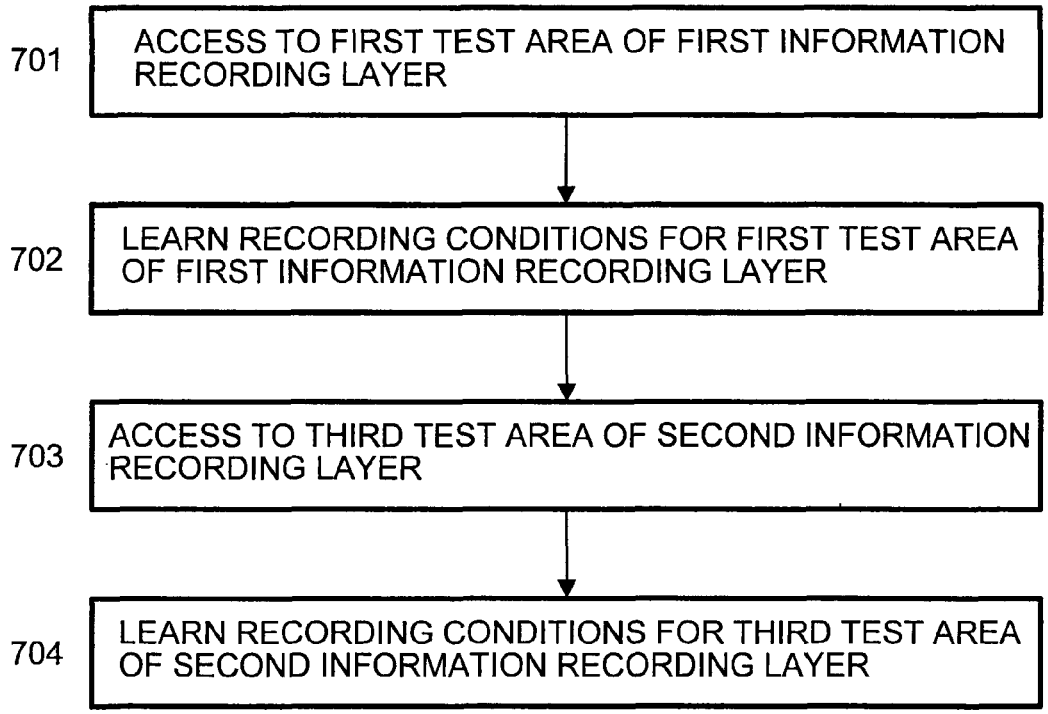
FIG. 10 is a flow chart illustrating recording learning.

The steps of the learning of recording conditions shown in FIG. 10 may be performed whenever the learning of recording conditions is necessary.

(Others)

The present invention has been described above with reference to preferred embodiments. However, the present invention should not be construed as one limited to these embodiments. It should be understood that the scope of the present invention is defined only by the claims. It is recognized that those skilled in the art can embody equivalents for the preferred embodiments of the present invention described herein, on the basis of the description of the present invention and common technical knowledge. It is also recognized that patents, patent applications, and documents referred herein should be incorporated herein as if their entirety are specifically described in the present specification.

The present invention is useful in any technical field where there is the demand for recordable dual-layer optical discs which allow precise recording learning on both layers.

The invention claimed is:

1. An optical disc comprising first and second information recording layers on which user data is recorded, the user data being recorded and reproduced through a same light incidence side of the optical disc on the first and second information recording layers, wherein
the first information recording layer comprises a first test area located at an inner radius, a second test area located at an outer radius, and a first data recording area configured to record the user data,
the second information recording layer comprises a third test area located at an inner radius, a fourth test area located at an outer radius, and a second data recording area configured to record the user data, and wherein
the first test area and the third test area are located at different radiuses and do not overlap each other, the second test area and the fourth test area are located at substantially equal radiuses, and the second information recording layer does not have any other test area that is located so as to overlap with the first test area of the first information recording layer.

2. An optical disc according to claim 1, wherein
the first information recording layer comprises a read-only control data area, and
the third test area is located at a position opposite to the control data area.

3. An optical disc according to claim 2, wherein the control data area has an embossed pit, a wobble groove, or a wobble pit which represents predetermined control data.

4. An optical disc according to claim 2, wherein
the control data area, the first test area, and the first data recording area are located in this order from the inner radius on the first information recording layer, and
the third test area and the second data recording area are located in this order from the inner radius on the second information recording layer.

5. An optical disc according to claim 4, wherein a distance between an innermost radius R1 of the first test area and an outermost radius R2 of the third test area is equal to or greater than a sum of track eccentricities of the first information recording layer and the second information recording layer.

6. An optical disc according to claim 5, wherein the distance between the radius R1 and the radius R2 is equal to or greater than a distance corresponding to the sum of the track eccentricities of the first information recording layer and the second information recording layer plus a beam radius of reading light on the second information recording layer when a reading light converges on the first information recording layer.

7. An optical disc according to claim 5, wherein the distance between the radius R1 and the radius R2 is equal to or greater than a distance corresponding to the sum of the track eccentricities of the first information recording layer and the second information recording layer plus a sum of radial tolerances of the track starting ends of the first information recording layer and the second information recording layer.

8. An optical disc according to claim 1, wherein the distance from a light incidence side to the first information recording layer is equal to the distance between a light incidence side and an information recording layer of an optical disc comprising a single information recording layer.

9. An optical disc according to claim 1, wherein
the first information recording layer comprises a read-only control data area, and
the control data area stores control data concerning both the first information recording layer and the second information recording layer.

10. An optical disc according to claim 1, wherein writing into the test areas is performed continuously from the inner radius to the outer radius, or vice versa.

11. An optical disc according to claim 10, wherein data is written continuously from the first information recording layer, which is located further from the light incidence side, to the second information recording layer, which is located closer to the light incidence side.

12. An optical disc apparatus configured to record data on an optical disc according to claim 1, comprising:
an optical head configured to irradiate the optical disc with light, and output a signal in response to light reflected from the optical disc;
an optical head driver unit configured to drive the optical head under predetermined recording conditions; and a control unit configured to control the optical head driver unit in response to the signal received from the optical head, wherein the control unit performs recording learning at the first test area and the third test area, and thereby determines respective recording conditions for the first information recording layer and the second information recording layer.

* * * * *